(12) United States Patent
Hsu

(10) Patent No.: US 8,265,626 B2
(45) Date of Patent: Sep. 11, 2012

(54) METHOD OF SETTING UP CONNECTION IN A COMMUNICATION SYSTEM, RADIO NETWORK CONTROLLER, AND COMMUNICATION SYSTEM

(75) Inventor: Yu-Ching Hsu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 368 days.

(21) Appl. No.: 12/638,999

(22) Filed: Dec. 16, 2009

(65) Prior Publication Data

US 2010/0151859 A1    Jun. 17, 2010

Related U.S. Application Data

(60) Provisional application No. 61/122,907, filed on Dec. 16, 2008.

(30) Foreign Application Priority Data

May 22, 2009 (TW) ................................ 98117169 A

(51) Int. Cl.
*H04W 4/00* (2009.01)
(52) U.S. Cl. .................. 455/435.1; 455/422.1; 455/450; 370/328
(58) Field of Classification Search ........................ None
See application file for complete search history.

(56) References Cited

U.S. PATENT DOCUMENTS

| 2007/0097938 | A1 | 5/2007 | Nylander et al. |
| 2008/0132239 | A1 | 6/2008 | Khetawat et al. |
| 2008/0305835 | A1 | 12/2008 | Johnstone et al. |
| 2010/0290389 | A1* | 11/2010 | Hou et al. ..................... 370/328 |
| 2011/0009113 | A1* | 1/2011 | Vikberg et al. ............. 455/422.1 |

FOREIGN PATENT DOCUMENTS

TW        200803556        1/2008

OTHER PUBLICATIONS

"Office Action of Taiwan counterpart application" issued on Jun. 22, 2012, p1-p4, in which the listed references were cited.

* cited by examiner

*Primary Examiner* — Erika Gary
(74) *Attorney, Agent, or Firm* — Jianq Chyun IP Office

(57) ABSTRACT

A method of setting up a connection in a communication system is provided, wherein the communication system includes a user equipment (UE). The present method includes following steps. When a first radio resource control (RRC) connection request message is received from the UE, whether the first RRC connection request message has been received before is determined. If the first RRC connection request message has been received, a first RRC connection setup message is sent back to the UE. If the first RRC connection request message has not been received, whether there is an accessible Femto access point (FAP) near the UE is further determined. If there is the accessible FAP near the UE, a first RRC connection reject message is sent back to the UE. If there is no accessible FAP near the UE, the first RRC connection setup message is sent back to the UE.

21 Claims, 5 Drawing Sheets

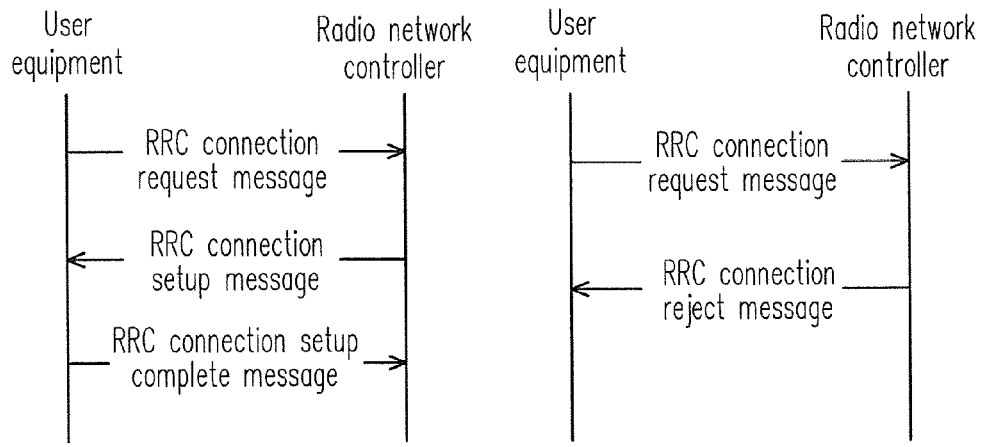
FIG. 1A (PRIOR ART)
FIG. 1B (PRIOR ART)
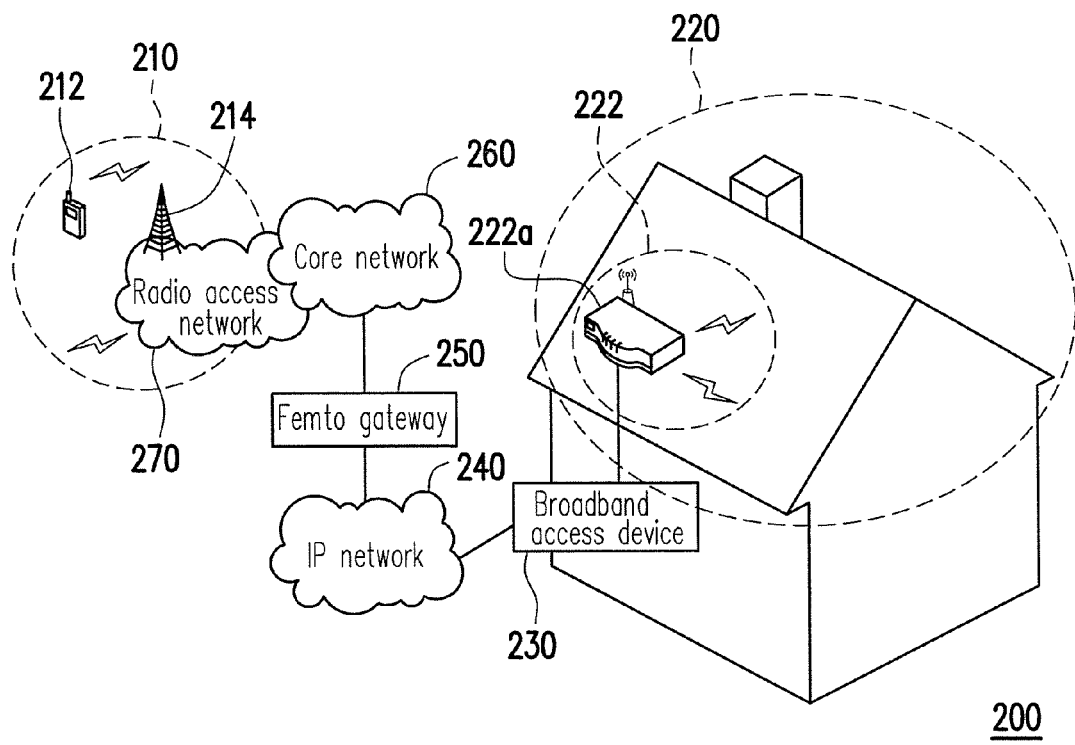
FIG. 2 (PRIOR ART)

METHOD OF SETTING UP CONNECTION IN A COMMUNICATION SYSTEM, RADIO NETWORK CONTROLLER, AND COMMUNICATION SYSTEM

CROSS-REFERENCE TO RELATED APPLICATION

This application claims the priority benefit of U.S. provisional application Ser. No. 61/122,907, filed on Dec. 16, 2008. This application also claims the priority benefit of Taiwan application serial no. 98117169, filed on May 22, 2009. The entirety of each of the above-mentioned patent applications is hereby incorporated by reference herein and made a part of this specification.

BACKGROUND OF THE APPLICATION

1. Field of the Application

The present application generally relates to a communication system, and more particularly, to a method of setting up a connection in a communication system and a radio network controller (RNC) and the communication system using the same.

2. Description of Related Art

In a conventional cellular radio system, a user equipment (UE, a handheld communication device, such as a cell phone) communicates with the core network (CN) through a radio access network (RAN).

Conventionally, when a UE is about to set up a connection with a CN through a Node B, the UE sends a radio resource control (RRC) connection request to the base state to set up the connection, wherein the Node B may be an eNodeB in a LTE RAN network structure or a NodeB in a WCDMA RAN network structure. Below, a radio network controller (RNC) of a WCDMA network structure will be described as an example.

FIG. 1A is a flowchart illustrating how conventionally a UE sets up a RRC connection with a RNC, wherein the RRC connection is successfully set up. As shown in FIG. 1A, when the UE is about to enter a connected mode from an idle mode, the UE sends a RRC connection request message to the RNC. Then, the RNC sends a RRC connection setup message back to the UE. After that, the UE further sends a RRC connection setup complete message to the RNC. By now, the UE successfully enters the connected mode from the idle mode.

FIG. 1B is another flowchart illustrating how conventionally a UE establishes a RRC connection with a RNC, wherein the setup of the RRC connection fails. Referring to FIG. 1B, after the UE sends the RRC connection request message to the RNC, the RNC sends a RRC connection reject message back to the UE if the RNC rejects the request of the UE due to some reasons (for example, in consideration of load balance). Thereby, the UE cannot set up the RRC connection with the RNC successfully and accordingly cannot enter the connected mode from the idle mode.

Besides controlling a RNS, a RNC may further be connected to a plurality of Nodes B, and each of the Nodes B serves a macro cellular cell (referred to as a macro cell thereinafter), wherein the macro cell is served by an outdoor Node B, while an indoor Femto cellular cell (referred to as a Femto cell thereinafter) is served by an indoor Femto access point (FAP).

A FAP (also known as a home Node B) is a small and low power cellular cell typically designed for use in a home or small business. A FAP extends the service area of a cellular network indoors to provide voice and data services to users. A FAP looks similar to a wireless fidelity (Wi-Fi) access point (AP) and which can be either used independently or integrated with a home gateway as a part of a home network.

Generally speaking, an indoor UE may still use the service provided by an outdoor Node B if the signal received from the outdoor Node B is good. However, in this case, the indoor Node B is not used.

FIG. 2 is a diagram of a conventional mobile communication network structure. As shown in FIG. 2, the communication network structure 200 includes a macro cell 210, a macro cell 220, a broadband access device 230, an IP network 240, a Femto gateway (Femto GW) 250, a CN 260, and a RAN 270. The macro cell 210 includes a Node B 214, wherein the Node B 214 performs wireless communication with a UE 212 so that the UE 212 can communicate with the CN 260 through the RAN 270.

The macro cell 220 contains a Femto cell 222, and the Femto cell 222 includes a FAP 222a. The UE 212 connects to the FAP 222a when it moves from the macro cell 210 to the Femto cell 222. The FAP 222a then connects to the IP network 240 through the broadband access device 230 of an indoor wired broadband network and further connects to the CN 260 through the Femto GW 250.

The technique described above of connecting to a wireless mobile network through a wired broadband network by using the FAP 222a allows less outdoor Nodes B to be deployed. In addition, since the FAP 222a has a lower transmission power, the transmission power of a cell phone is also lowered.

However, when the UE 212 which is in a communication session moves from an outdoor place (i.e., the coverage area of the macro cell 210) to an indoor place (i.e., the coverage area of the Femto cell 222), the UE 212 does not try to detect the FAP 222a if the signal provided by the macro cell 210 is strong enough. Besides, the UE 212 which is in an idle mode does not try to detect the FAP 222a if it receives a strong signal from the macro cell 220. Thereby, how to allow the UE 212 in the idle mode to detect the FAP 222a when the UE 212 needs to communicate with the CN 260 has become one of the major subjects in the industry.

SUMMARY OF THE APPLICATION

Accordingly, the present application is directed to a method of setting up a connection in a communication system, wherein a radio network controller (RNC) guides a user equipment (UE) to a Femto access point (FAP) at the proper time so that the UE can communicate with a core network (CN) through the FAP.

The present application is also directed to a RNC, wherein the RNC guides a UE to a FAP at the proper time so that the UE can communicate with a CN through the FAP.

The present application is further directed to a communication system including aforementioned RNC.

According to an embodiment of the present application, a method of setting up a connection in a communication system is provided. The present method includes following steps. First, when a first radio resource control (RRC) connection request message is received from a UE, whether the first RRC connection request message has been received before is determined. If the first RRC connection request message has been received, a first RRC connection setup message is sent back to the UE. Otherwise, if the first RRC connection request message has not been received, whether there is an accessible FAP near the UE is further determined. If there is the accessible FAP near the UE, a first RRC connection reject message is sent back to the UE to guide the UE to the accessible FAP.

Otherwise, if there is no accessible FAP near the UE, the first RRC connection setup message is sent back to the UE.

According to another embodiment of the present application, a RNC including a transceiver unit, a processing unit, and a database is provided. The transceiver unit receives a first RRC connection request message or a first RRC connection setup complete message from a UE and sends a first RRC connection setup message or a first RRC connection reject message back to the UE. The processing unit coupled to the transceiver unit determines whether the transceiver unit has received the first RRC connection request message from the UE before. If the transceiver unit has not received the first RRC connection request message, the processing unit searches the database to determine whether there is an accessible FAP near the UE so as to determine whether the transceiver unit needs to send the first RRC connection reject message to the UE to guide the UE to the accessible FAP and allow the UE to set up a connection with the FAP, wherein the first RRC connection reject message carries information of the FAP.

According to yet another embodiment of the present application, a communication system including a UE in an idle mode, a RNC, and a FAP is provided. The RNC includes a transceiver unit, a processing unit, and a database. The transceiver unit receives a first RRC connection request message or a first RRC connection setup complete message from the UE and sends a first RRC connection setup message or a first RRC connection reject message back to the UE. If the transceiver unit has not received the first RRC connection request message, the processing unit searches the database to determine whether there is an accessible FAP near the UE so as to determine whether the transceiver unit needs to send the first RRC connection reject message to the UE to guide the UE to the accessible FAP and allow the UE to set up a connection with the FAP, wherein the first RRC connection reject message carries information of the FAP.

As described above, a UE in an idle mode is (instantly) guided to a FAP at the proper time so that the UE can communicate with a CN through the FAP.

It is to be understood that both the foregoing general description and the following detailed description are exemplary, and are intended to provide further explanation of the application as claimed.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

FIG. 1A is a flowchart illustrating how conventionally a user equipment (UE) sets up a radio resource control (RRC) connection with a RNC.

FIG. 1B is another flowchart illustrating how conventionally a UE sets up a RRC connection with a RNC.

FIG. 2 is a diagram of a conventional mobile communication network structure.

DESCRIPTION OF THE EMBODIMENTS

Figure 3:
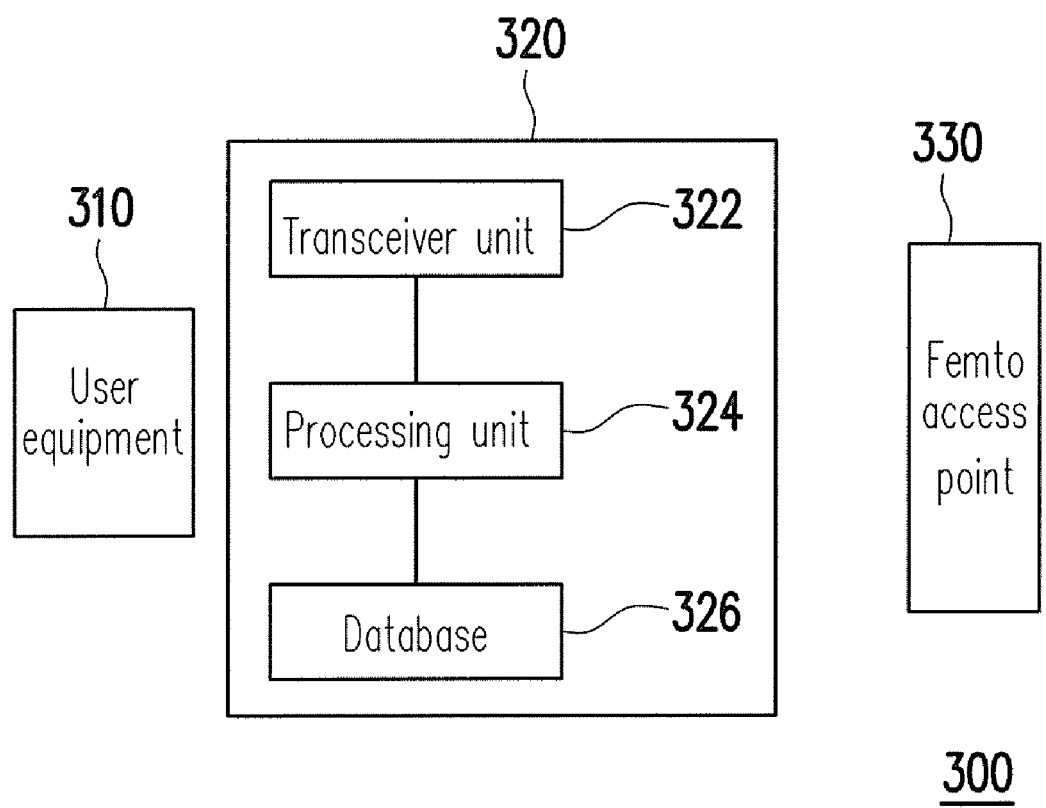
FIG. 3 is a block diagram of a communication system according to an exemplary embodiment of the present application.

Reference will now be made in detail to the present preferred embodiments of the application, examples of which are illustrated in the accompanying drawings. Wherever possible, the same reference numbers are used in the drawings and the description to refer to the same or like parts.

In embodiments of the present application, a method of setting up a connection in a communication system is provided, wherein a radio network controller (RNC) can guide a user equipment (UE) to a Femto access point (FAP) at the proper time so that the UE can communicate with a core network through the FAP.

The present embodiment provides a method of setting up a connection in a communication system, wherein the communication system includes a UE. The present method includes following steps. First, when a first radio resource control (RRC) connection request message is received from the UE, whether the first RRC connection request message has been received before is determined. If the first RRC connection request message has been received, a first RRC connection setup message is sent back to the UE. Otherwise, if the first RRC connection request message has not been received, whether there is an accessible FAP near the UE is further determined. If there is the accessible FAP near the UE, a first RRC connection reject message is sent back to the UE to guide the UE to the accessible FAP. Contrarily, if there is no accessible FAP near the UE, the first RRC connection setup message is sent back to the UE.

In the present embodiment, the UE is in an idle mode before it issues the first RRC connection request message.

In the present embodiment, when the UE receives the first RRC connection setup message, the UE further sends a first RRC connection setup complete message to the FAP.

In the present embodiment, to set up a connection between the UE and the FAP, first, whether there is an accessible FAP near the UE is determined, and the first RRC connection reject message is sent back to the UE, wherein the first RRC connection reject message carries information of the FAP. Then, the UE sends a second RRC connection request message to the FAP according to the first RRC connection reject message, so as to establish the connection between the UE and the FAP.

In the present embodiment, to set up the connection between the UE and the FAP, when the FAP receives the second RRC connection request message, the FAP sends a second RRC connection setup message back to the UE, and then the UE sends a second RRC connection setup complete message to the FAP.

In the present embodiment, whether there is the accessible FAP around the UE may be determined by searching a database. The database includes a first table and a second table. The first table stores the FAP and the UE that can access the FAP to establish a first mapping between the FAP and the UE. The second table stores a relative location of the FAP to establish a second mapping between the FAP and the relative location, wherein the relative location of the FAP may be a macro cell corresponding to the FAP or a neighbouring cell near the FAP.

In the present embodiment, the second mapping may be established by scanning the neighbouring cell when the FAP is turned on and sending information of the neighbouring cell into the database. In an embodiment, the second mapping is established through a global positioning system (GPS) technique.

According to an embodiment of the present application, a RNC is provided, wherein the RNC can guide a UE to a FAP at the proper time so that the UE can communicate with a core network through the FAP.

According to an embodiment of the present application, a RNC including a transceiver unit, a processing unit, and a database is provided. The transceiver unit receives a first RRC connection request message or a first RRC connection setup complete message from a UE and sends a first RRC connection setup message or a first RRC connection reject message back to the UE. The processing unit coupled to the transceiver unit determines whether the transceiver unit has received the first RRC connection request message from the UE before. If the transceiver unit has not receive the first RRC connection request message, the processing unit searches a database to determine whether there is an accessible FAP near the UE, so as to determine whether the transceiver unit needs to send the first RRC connection reject message to the UE to guide the UE to the accessible FAP and allow the UE to set up the connection with the FAP, wherein the first RRC connection reject message carries information of the FAP.

According to an embodiment of the present application, a communication system including aforementioned RNC is provided. The communication system includes a UE in an idle mode, the RNC, and a FAP. The RNC includes a transceiver unit, a processing unit, and a database. The transceiver unit receives a first RRC connection request message or a first RRC connection setup complete message from the UE and sends a first RRC connection setup message or a first RRC connection reject message back to the UE. If the transceiver unit has not received the first RRC connection request message before, the processing unit searches a database to determine whether there is an accessible FAP near the UE, so as to determine whether the transceiver unit needs to send the first RRC connection reject message to the UE to guide the UE to the accessible FAP and allow the UE to set up the connection with the FAP, wherein the first RRC connection reject message carries information of the FAP.

Below, embodiments of the present application will be described with reference to accompanying drawings.

FIG. 3 is a block diagram of a communication system according to an exemplary embodiment of the present application. Referring to FIG. 3, in the present exemplary embodiment, the communication system 300 includes a UE 310 in an idle mode, a RNC 320, and a FAP 330. The RNC 320 includes a transceiver unit 322, a processing unit 324, and a database 326. The transceiver unit 322 receives a first RRC connection request message from the UE 310 and sends a first RRC connection setup message or a first RRC connection reject message back to the UE 310. The processing unit 324 is coupled to the transceiver unit 322. If the transceiver unit 322 has not received the first RRC connection request message, the processing unit 324 searches the database 326 to determine whether there is an accessible FAP (for example, the FAP 330 in FIG. 3) near the UE 310, so as to determine whether the transceiver unit 322 needs to send the first RRC connection reject message to the UE 310 to guide the UE 310 to the accessible FAP 330 and allow the UE 310 to set up the connection with the FAP 330. In the present exemplary embodiment, because the first RRC connection reject message carries information of the FAP 330, the RNC 320 understands how to guide the UE 310 to the accessible FAP 330 through the first RRC connection reject message.

Figure 4A:
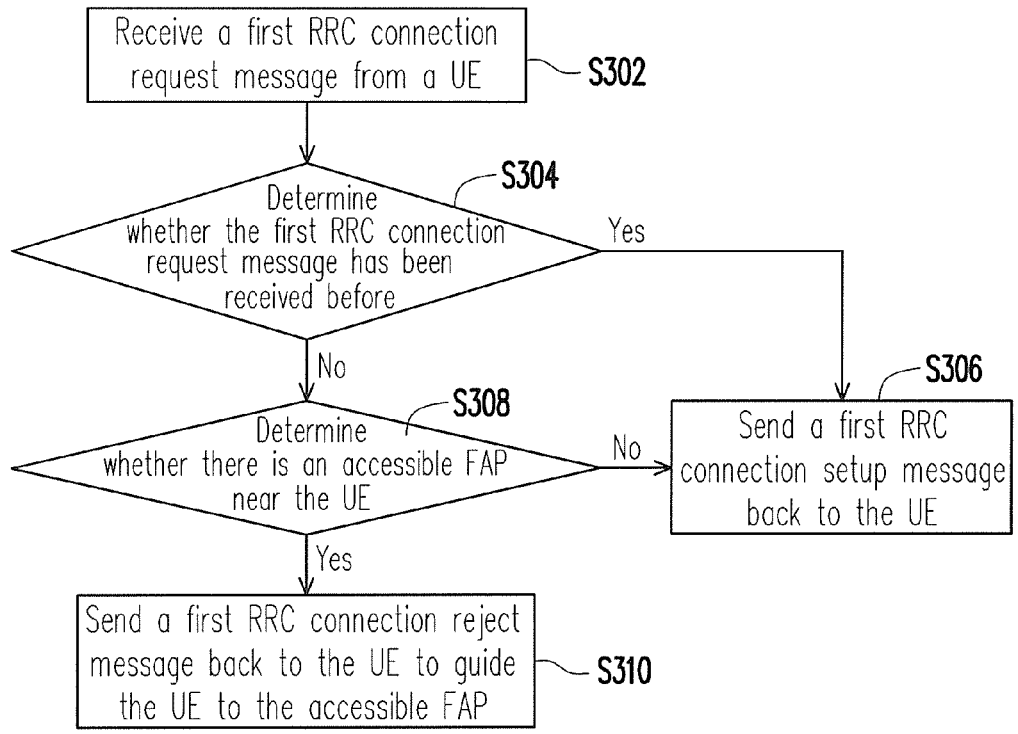
FIG. 4A is a flowchart of a method of setting up a connection in the communication system in FIG. 3 according to an embodiment of the present application.

FIG. 4A is a flowchart of a method of setting up a connection in the communication system in FIG. 3 according to an embodiment of the present application. Referring to both FIG. 3 and FIG. 4A, the method of setting up a connection in the communication system 300 includes following steps. First, the RNC 320 receives a first RRC connection request message from the UE 310 (step S302). Then, the RNC 320 determines whether the first RRC connection request message has been received before (step S304). If the RNC 320 has received the first RRC connection request message before, the RNC 320 sends a first RRC connection setup message back to the UE 310 (step S306). Contrarily, if the RNC 320 has not received the first RRC connection request message, the RNC 320 determines whether the accessible FAP 330 is located near the UE 310 (step S308). Finally, if the accessible FAP 330 is located near the UE 310, the RNC 320 sends a first RRC connection reject message back to the UE 310 to guide the UE 310 to the accessible FAP 330 (step S310). Contrarily, if the accessible FAP 330 is not located around the UE 310, the RNC 320 sends the first RRC connection setup message back to the UE 310 (step S306). In foregoing step S304, the RNC 320 determines whether the first RRC connection request message has been received before by searching the database 326 of the RNC 320 or searching a context area in a memory of the UE 310.

Figure 4B:
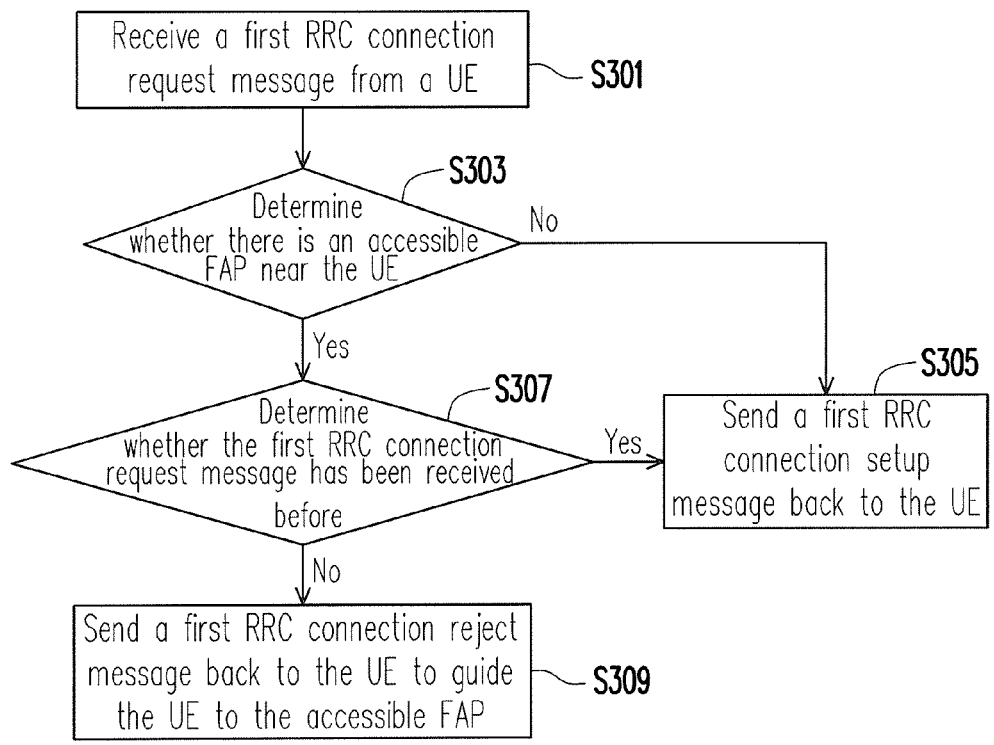
FIG. 4B is a flowchart of a method of setting up a connection in the communication system in FIG. 3 according to another embodiment of the present application.
Figure 5A:
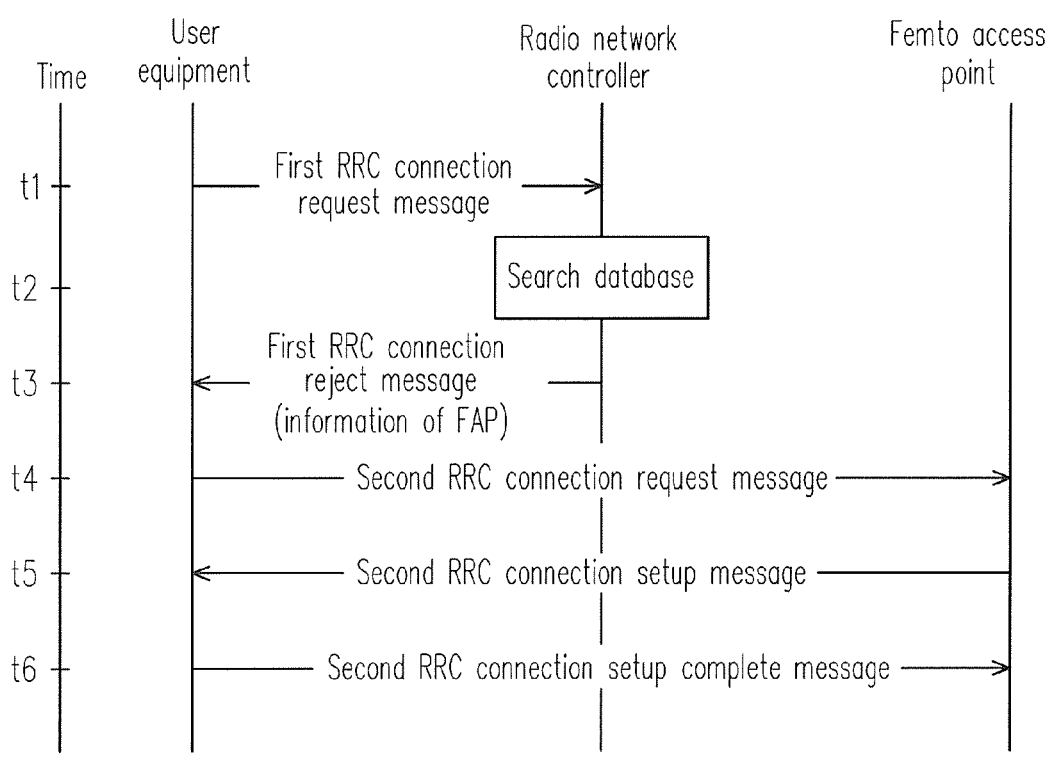
FIG. 5A is a flowchart of a method of setting up a connection in the communication system in FIG. 4A according to an embodiment of the present application.

In other exemplary embodiments, the same purpose can be achieved if the steps S304 and S308 are executed in a reverse sequence, as shown in FIG. 4B. First, the RNC 320 receives the first RRC connection request message from the UE 310 (step S301). Then, the RNC 320 determines whether the accessible FAP 330 is located near the UE 310 (step S303). If the accessible FAP 330 is not located near the RNC 320, the RNC 320 sends the first RRC connection setup message back to the UE 310 (step S305). Contrarily, if the accessible FAP 330 is located near the UE 310, the RNC 320 determines whether the first RRC connection request message has been received before (step S307). If the RNC 320 has received the first RRC connection request message, the RNC 320 sends a first RRC connection setup message back to the UE 310 (step S305). Finally, if the RNC 320 has not received the first RRC connection request message, the RNC 320 sends a first RRC connection reject message back to the UE 310 to guide the UE 310 to the accessible FAP 330 (step S309). FIG. 5A is a flowchart of a method of setting up a connection in the communication system in FIG. 4A according to an embodiment of the present application, wherein the UE 310 successfully connects to the FAP 330. Referring to FIG. 3, FIG. 4, and FIG. 5A, the UE 310 sends a first RRC connection request message to the RNC 320 at time t1 (as illustrated in FIG. 5A), and in step S304, the RNC 320 determines whether the first RRC connection request message has been received before. Next, if the RNC 320 has not received the first RRC connection request message, the RNC 320 searches the database 326 to determine whether there is an accessible FAP near the UE 310 at time t2 (step S308). Below, step S308 will be further described in detail.

In the present exemplary embodiment, the database 326 includes a first table and a second table. The first table stores FAPs and UEs that can access the FAPs so as to establish a first mapping between the FAPs and the UEs. Besides, the first table can be pre-established, and the first mapping established in the first table is as shown in following table 1:

TABLE 1

| Name | Accessing UE |
| --- | --- |
| FAP 330 | UE 310, UEs1~3 |
| FAP 1 | UEs 2~5 |
| FAP 2 | UEs 6~7 |

As shown in table 1, the UEs that can access the FAP 330 include UE 310, UE 1, UE 2, and UE 3, the UEs that can access the FAP 1 include UEs 2~5, and the UEs that can access the FAP 2 include UE 6 and UE 7. Accordingly, all the UEs that can access the FAP 330 can be obtained by searching the first table.

In addition, the second table in the database 326 stores a relative location of each FAP so as to establish a second mapping between the FAP and the relative location. The second mapping is as shown in following table 2A:

TABLE 2A

| Name | Relative location |
| --- | --- |
| FAP 330 | Location 1 |
| FAP 1 | Location 2 |
| FAP 2 | Location 3 |

As shown in table 2A, the relative location of the FAP 330 is location 1, the relative location of the FAP 1 is location 2, and the relative location of the FAP 2 is location 3. Accordingly, the relative location of each FAP can be obtained by searching foregoing table 2A. Besides, the relative location of a FAP may be a macro cell corresponding to the FAP and obtained from a scanning result of the FAP when the FAP is turned on. In addition, the relative location of a FAP may also be a neighbouring cell of the FAP and obtained by scanning the neighbouring cell when the FAP is turned on.

The second mapping described above is shown in following table 2B:

TABLE 2B

| Name | Neighbouring Cell |
| --- | --- |
| FAP 330 | Nodes B 1~3 |
| FAP 1 | Nodes B 4~6 |
| FAP 2 | Nodes B 7~8 |

Thereby, the neighbouring cells of the FAP 330 can be determined as Nodes B 1~3 by searching the table 2B. Similarly, the neighbouring cells of the FAP 1 are Nodes B 4~6, and the neighbouring cells of the FAP 2 are Nodes B 7~8. To obtain the relative locations, the FAP automatically scans the neighbouring cells when the FAP is turned on and sends information of the neighbouring cells into the database 326. Accordingly, the RNC 320 can determine whether there is an accessible FAP near the UE 310 by searching the first table and the second table. In an embodiment, if the communication system is integrated with a positioning method (for example, a global position system (GPS) technique), whether a UE is located near a FAP can be precisely determined by comparing the GPS information of the UE and the FAP. However, the positioning method is not limited to aforementioned GPS technique.

Referring to FIG. 3, FIG. 4, and FIG. 5A, if the RNC 320 searches the database 326 and determines that the accessible FAP 330 is located near the UE 310, the RNC 320 sends a first RRC connection reject message back to the UE 310 at time t3, wherein the first RRC connection reject message carries information of the FAP 330 such that the UE 310 can be guided to the accessible FAP 330 (step S310). Then, at time t4 in FIG. 5A, the UE 310 sends a second RRC connection request message back to the FAP 330 according to the first RRC connection reject message, so as to set up a connection with the FAP 330. Next, the FAP 330 sends a second RRC connection setup message back to the UE 310 at time t5. Finally, the UE 310 sends a second RRC connection setup complete message to the FAP 330 at time t6. Herein the RNC 320 successfully guides the UE 310 to the FAP 330 and a RRC connection is successfully set up.

Figure 5B:
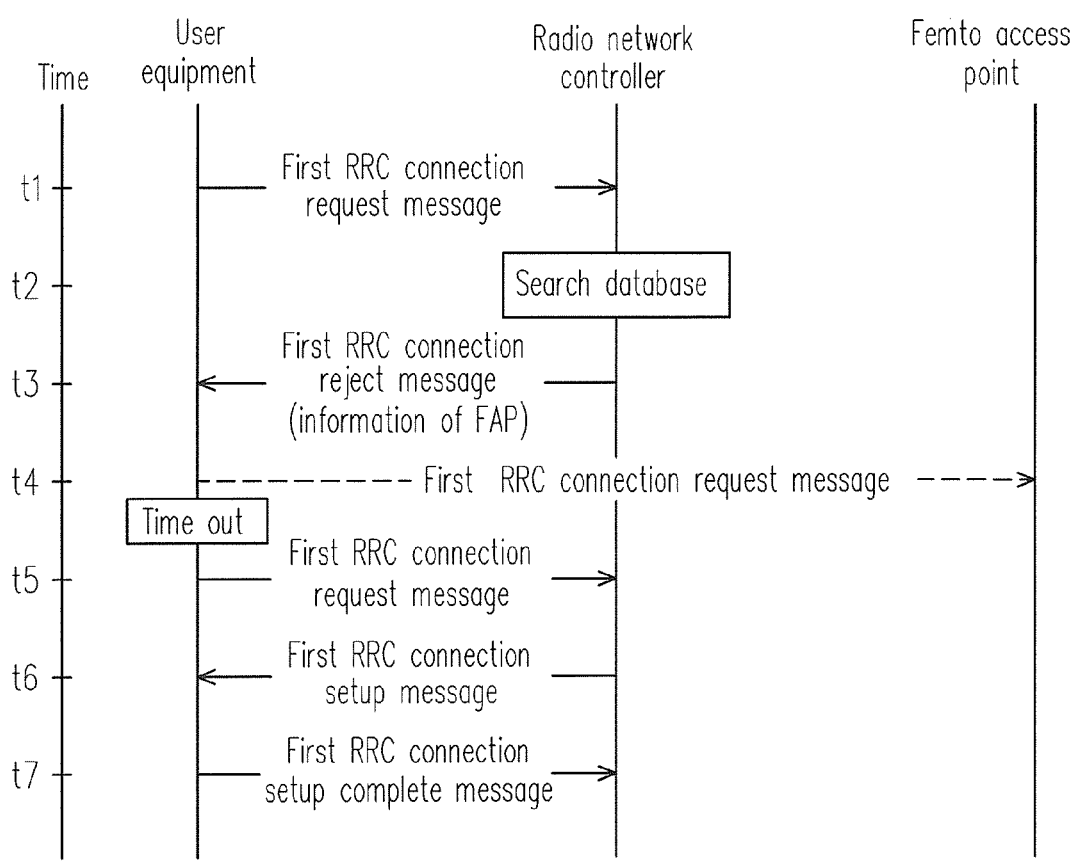
FIG. 5B is a flowchart of a method of setting up a connection in the communication system in FIG. 4A according to another embodiment of the present application.

FIG. 5B is a flowchart of a method of setting up a connection in the communication system in FIG. 4 according to another embodiment of the present application, wherein the connection between the UE 310 and the FAP 330 is not successfully set up. Referring to FIG. 3, FIG. 4, and FIG. 5B, at time t1 in FIG. 5B, the UE 310 sends a first RRC connection request message to the RNC 320, and the RNC 320 determines whether a first RRC connection request message has been received before (step S304). If the RNC 320 has not received the first RRC connection request message, the RNC 320 then searches a database 326 at time t2 to determine whether there is an accessible FAP around the UE 310 (step S308). If the RNC 320 determines that the accessible FAP 330 is located near the UE 310, the RNC 320 sends a first RRC connection reject message to the UE 310 at time t3, wherein the first RRC connection reject message carries information of the FAP 330 such that the UE 310 can be guided to the accessible FAP 330 (step S310). At time t4 in FIG. 5B, the UE 310 sends a second RRC connection request message to the FAP 330 according to the first RRC connection reject message so as to set up a connection with the FAP 330. However, even though the UE 310 detects the FAP 330, its request is not responded therefore will time out. Thus, the UE 310 sends the first RRC connection request message to the RNC 320 again at time t5. Since this is the second time that the RNC 320 receives the RRC connection request message from the UE 310, the RNC 320 sends a first RRC connection setup message back to the UE 310 at time t6. Besides, the RRC connection request message sent again to the RNC 320 usually has a substantially different transaction identifier.

Finally, the UE 310 sends a first RRC connection setup complete message to the RNC 320. By now, even though the RNC 320 does not successfully guide the UE 310 to the FAP 330 (therefore the UE 310 cannot set up the connection with the FAP 330 successfully), the UE 310 can still set up a RRC connection with the RNC 320. Namely, the UE 310 can still enter a connected mode from an idle mode.

Even though the RNC 320 sends the first RRC connection reject message carrying the information of the FAP 330 back to the UE 310 at time t3 when the RNC 320 detects that the FAP 330 is located near the UE 310, the UE 310 does not send the second RRC connection request message to the FAP 330 at time t4 if the UE 310 still cannot detect the FAP 330, or the request times out if the UE 310 detects the FAP 330 but does not receive any response from the FAP 330.

Additionally, the RNC 320 needs to record every RRC connection request message it receives so that later on whether the UE 310 has sent the RRC connection request message within a specific time can be determined. However, where the RNC 320 records the RRC connection request message varies in different embodiments. For example, the RNC 320 may record the RRC connection request message in the database 326 of the RNC 320 or in a context area (for example, a database or a memory, not shown) of the UE 310. Thus, when the RNC 320 receives the RRC connection request message (i.e., a third RRC connection request message) again at time t5, the RNC 320 may search the database during the time period t5~t6 to determine whether the UE 310 has sent the RRC connection request message during a specific time.

As described above, in the method of setting up a connection in a communication system provided by exemplary embodiments of the present application, a RNC automatically determines whether there is an accessible FAP near a UE that issues a RRC connection request and guides the UE to the accessible FAP so that the UE can communicate with a core network by using the FAP.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A method of setting up a connection in a communication system, the communication system comprising a user equipment (UE) and a network controller (RNC), the method being performed by the RNC and comprising:
    receiving a first radio resource control (RRC) connection request message from the UE;
    determining whether the first RRC connection request message has been received before, wherein
    if the first RRC connection request message has been received before, a first RRC connection setup message is sent back to the UE, and if the first RRC connection request message has not been received before, whether there is an accessible Femto access point (FAP) near the UE is further determined; and
    if there is the accessible FAP near the UE, a first RRC connection reject message is sent back to the UE to guide the UE to the accessible FAP, and if there is no accessible FAP near the UE, the first RRC connection setup message is sent back to the UE.

2. The method according to claim 1 further comprising:
    when the first RRC connection setup message is received by the UE, sending back a first RRC connection setup complete message from the UE to the RNC.

3. The method according to claim 1, wherein the connection is set up between the UE and the FAP by:
    determining whether there is the accessible FAP near the UE;
    sending back the first RRC connection reject message to the UE, wherein the first RRC connection reject message carries an information of the FAP; and
    sending back a second RRC connection request message from the UE to the FAP according to the first RRC connection reject message, so as to set up the connection between the UE and the FAP.

4. The method according to claim 3, wherein the connection is set up between the UE and the FAP further by:
    when the second RRC connection request message is received by the FAP, sending back a second RRC connection setup message from the FAP to the UE; and
    sending back a second RRC connection setup complete message from the UE to the FAP.

5. The method according to claim 3, wherein the step of determining whether there is the accessible FAP near the UE comprises searching a database, wherein the database stores a context of the FAP.

6. The method according to claim 5, wherein the context stores the FAP and the UE that accesses the FAP to establish a first mapping between the FAP and the UE, and the context stores a relative location of the FAP to establish a second mapping between the FAP and the relative location, wherein the relative location is a macro cell corresponding to the FAP or a neighboring cell near the FAP.

7. The method according to claim 6, wherein the second mapping is established by scanning the neighboring cell when the FAP is turned on and sending an information of the neighbouring cell into the database by using the FAP.

8. The method according to claim 6, wherein the second mapping is established by using a global positioning system (GPS) technique.

9. A radio network controller (RNC), comprising:
    a transceiver unit, for receiving a first RRC connection request message from a UE and sending back a first RRC connection setup message or a first RRC connection reject message to the UE;
    a processing unit, coupled to the transceiver unit, for determining whether the transceiver unit has received the first RRC connection request message from the UE before, and if the transceiver unit has not received the first RRC connection request message before, searching a database to determine whether there is an accessible FAP near the UE, so as to determine whether the transceiver unit needs to send the first RRC connection reject message to the UE to guide the UE to the accessible FAP and allow the UE to set up the connection with the FAP, wherein the first RRC connection reject message carries an information of the FAP; and
    a database, coupled to the processing unit, for storing a context of the FAP.

10. The RNC according to claim 9, wherein when the UE receives the first RRC connection setup message, the UE sends back a first RRC connection setup complete message to the RNC.

11. The RNC according to claim 9, wherein when the UE receives the first RRC connection reject message, the UE sends a second RRC connection request message to the FAP to set up a connection with the FAP.

12. The RNC according to claim 11, wherein when the UE sends the second RRC connection request message to the FAP, the FAP sends back a second RRC connection setup message to the UE, and the UE then sends a second RRC connection setup complete message to the FAP.

13. The RNC according to claim 9, wherein the context comprises a first mapping and a second mapping, wherein
    the first mapping stores the FAP and the UE that accesses the FAP to establish a first mapping between the FAP and the UE,
    and the second mapping stores a relative location of the FAP to establish a second mapping between the FAP and the relative location, wherein the relative location is a macro cell corresponding to the FAP or a neighbouring cell near the FAP.

14. The RNC according to claim 13, wherein the second mapping is established by scanning the neighbouring cell when the FAP is turned on and sending an information of the neighbouring cell into the database by using the FAP.

15. The RNC according to claim 13, wherein the second mapping is established by using a GPS technique.

16. A communication system, comprising a UE, a RNC, and a FAP, wherein the RNC comprises:
    a transceiver unit, for receiving a first RRC connection request message or a first RRC connection setup complete message from the UE and sending back a first RRC connection setup message or a first RRC connection reject message to the UE;

a processing unit, coupled to the transceiver unit, for determining whether the transceiver unit has received the first RRC connection request message from the UE before, and if the transceiver unit has not received the first RRC connection request message before, searching a database to determine whether there is the accessible FAP near the UE, so as to determine whether the transceiver unit needs to send the first RRC connection reject message to the UE to guide the UE to the accessible FAP and allow the UE to set up a connection with the FAP, wherein the first RRC connection reject message carries an information of the FAP; and a database, coupled to the processing unit, for storing a context of the FAP.

17. The communication system according to claim 16, wherein when the UE receives the first RRC connection reject message, the UE sends a second RRC connection request message to the FAP to set up the connection with the FAP.

18. The communication system according to claim 17, wherein when the UE sends the second RRC connection request message to the FAP, the FAP sends back a second RRC connection setup message to the UE, and the UE then sends a second RRC connection setup complete message to the FAP.

19. The communication system according to claim 16, wherein the context comprises a first mapping and a second mapping, wherein the first mapping stores the FAP and the UE that accesses the FAP to establish a first mapping between the FAP and the UE, and the second mapping stores a relative location of the FAP to establish a second mapping between the FAP and the relative location, wherein the relative location is a macro cell corresponding to the FAP or a neighbouring cell near the FAP.

20. The communication system according to claim 19, wherein the second mapping is established by scanning the neighbouring cell when the FAP is turned on and sending an information of the neighbouring cell to the database by using the FAP.

21. The communication system according to claim 19, wherein the second mapping is established by using a GPS technique.

* * * * *